US012585683B1

(12) United States Patent
Su et al.

(10) Patent No.: US 12,585,683 B1
(45) Date of Patent: Mar. 24, 2026

(54) SOLVING MULTILINGUAL QUERIES USING VECTOR DATABASE

(71) Applicant: International Business Machines Corporation, Armonk, NY (US)

(72) Inventors: Jun Su, Beijing (CN); Yin Xia, Beijing (CN); Douglas Brian Mueller, Apex, NC (US); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/893,660

(22) Filed: Sep. 23, 2024

(51) Int. Cl.
| *G06F 16/30* | (2019.01) |
| *G06F 16/3332* | (2025.01) |
| *G06F 16/334* | (2025.01) |
| *G06F 16/383* | (2019.01) |

(52) U.S. Cl.
CPC ...... *G06F 16/3337* (2019.01); *G06F 16/3347* (2019.01); *G06F 16/383* (2019.01)

(58) Field of Classification Search
CPC . G06F 16/3337; G06F 16/3347; G06F 16/383
See application file for complete search history.

(56) References Cited

U.S. PATENT DOCUMENTS 9,621,601 B2 4/2017 Johnson, Jr. et al.
10,762,082 B2 * 9/2020 Ackermann ........ G06F 16/9537

2010/0145673 A1 * 6/2010 Cancedda ........... G06F 16/3337
                                                                 704/3
2017/0262529 A1 * 9/2017 Chim .................. G06F 16/3329
2018/0046937 A1 * 2/2018 Allen ....................... G06N 5/04
2019/0079917 A1 3/2019 Berzak et al.
2019/0138595 A1 5/2019 Galitsky (Continued)

FOREIGN PATENT DOCUMENTS

CN 112818128 A 5/2021
CN 113987121 A 1/2022

(Continued)

OTHER PUBLICATIONS

Article entitled "Multilingual COVID-QA: Learning towards Global Information Sharing via Web Question Answering in Multiple Languages", by Yan et al., dated Apr. 23, 2021 (Year: 2021).*

(Continued)

*Primary Examiner* — Mahesh H Dwivedi
(74) *Attorney, Agent, or Firm* — Zilka-Kotab, P.C.

(57) ABSTRACT

A method, according to one approach, includes: causing a received query to be translated from a first language to a second language. The method also includes generating potential answers for the translated query, and extracting features from the translated query. The method also includes causing the extracted features to be converted into feature vectors. The method also includes causing the feature vectors to be compared against existing vectors in a knowledge base that correspond to past question-answer pairs. The method also includes causing the potential answers to be ranked based at least in part on an outcome of comparing the feature vectors against the existing vectors in the knowledge base. Furthermore, the method includes causing a final answer to be generated based at least in part on the ranked potential answers.

18 Claims, 6 Drawing Sheets

(56) References Cited

U.S. PATENT DOCUMENTS

| | | | | |
|---|---|---|---|---|
| 2019/0213480 | A1* | 7/2019 | Lim | G06N 3/098 |
| 2021/0165833 | A1* | 6/2021 | Kim | G06F 18/214 |
| 2021/0216577 | A1* | 7/2021 | Xiao | G06F 16/3329 |
| 2022/0164538 | A1* | 5/2022 | Bornea | G06F 40/30 |
| 2024/0104624 | A1* | 3/2024 | Han | G06Q 30/0629 |
| 2024/0320246 | A1* | 9/2024 | Rosenthal | G06F 16/3329 |
| 2025/0094707 | A1* | 3/2025 | Portisch | G06F 40/284 |

FOREIGN PATENT DOCUMENTS

| | | |
|---|---|---|
| CN | 112100354 B | 7/2023 |
| KR | 102256664 B1 | 5/2021 |

OTHER PUBLICATIONS

Article entitled "XOR QA: Cross-Lingual Open-Retrieval Question Answering", by Asai et al., dated Apr. 13, 2021 (Year: 2021).*

Ko et al., "Probabilistic Models for Answer-Ranking in Multilingual Question-Answering," ACM Transactions on Information Systems, vol. 28, No. 3, Jun. 2010, pp. 16:1-16:37.

Gupta et al., "MMQA: A Multi-domain Multi-lingual Question-Answering Framework for English and Hindi," International Conference on Language Resources and Evaluation, May 2018, 8 pages, retrieved from https://www.semanticscholar.org/paper/MMQA%3A-A-Multi-domain-Multi-lingual-Framework-for-Gupta-Kumari/58999799249fa5ba9af5d7629c8e51a5bab64999.

Ture et al., "Learning to Translate for Multilingual Question Answering," Proceedings of the 2016 Conference on Empirical Methods in Natural Language Processing, Nov. 2016, pp. 573-584.

* cited by examiner

100

300

302 — Receive a query from a user

304 — Cause the query to be translated from the first language to a second predetermined language 306 — Inspect the translated query 308 — Cause potential answers to be generated for the translated query 310 — Cause features to be extracted from the translated query 312 — Cause the extracted features to be converted into vectors To operation
314
⋮

300

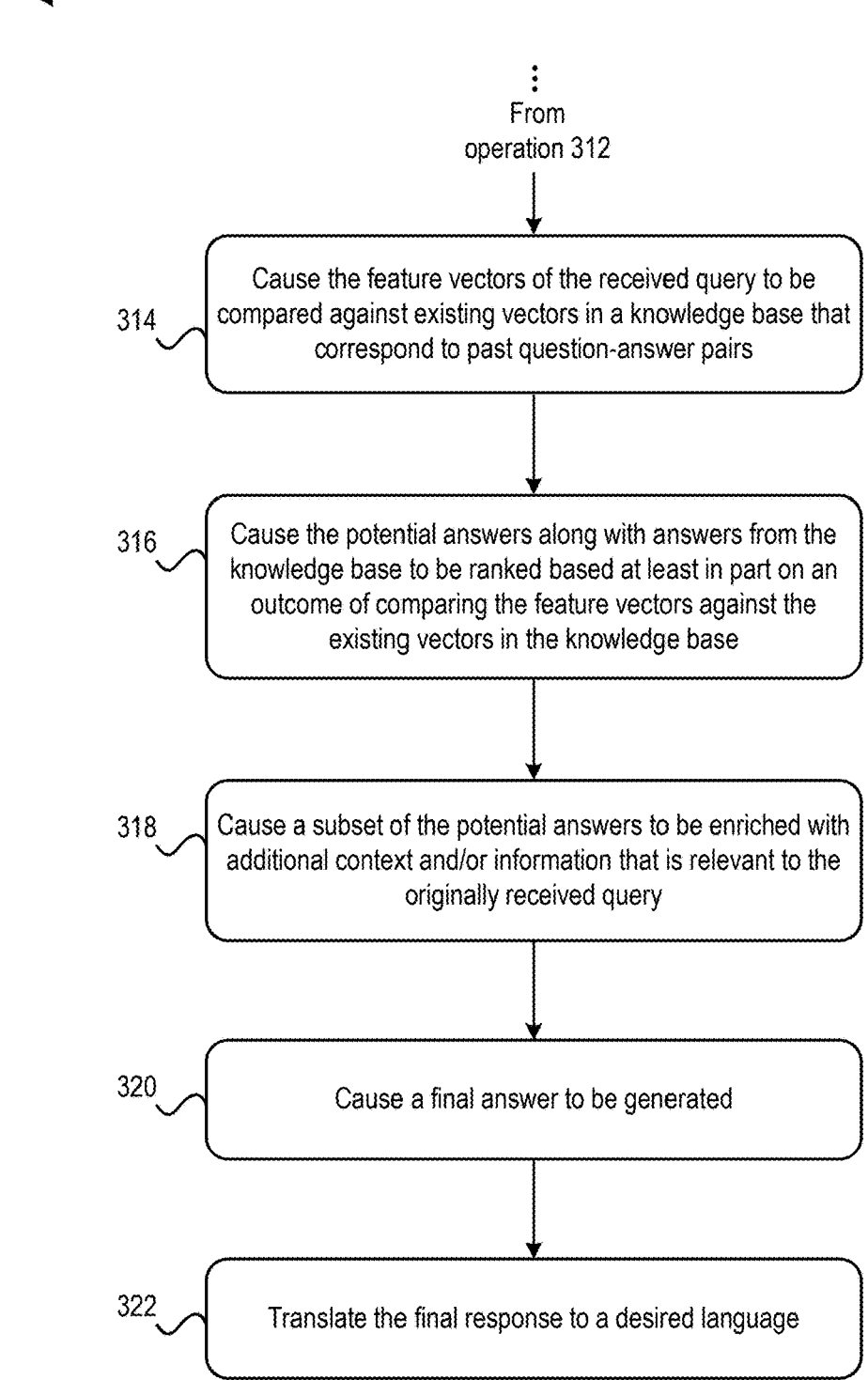

From
operation 312

314  Cause the feature vectors of the received query to be compared against existing vectors in a knowledge base that correspond to past question-answer pairs 316  Cause the potential answers along with answers from the knowledge base to be ranked based at least in part on an outcome of comparing the feature vectors against the existing vectors in the knowledge base 318  Cause a subset of the potential answers to be enriched with additional context and/or information that is relevant to the originally received query 320  Cause a final answer to be generated 322  Translate the final response to a desired language

FIG. 3
(Continued)

SOLVING MULTILINGUAL QUERIES USING VECTOR DATABASE

BACKGROUND

The present invention relates to processing user queries, and more specifically, this invention relates to processing multilingual queries.

AI based models have emerged in recent years, providing users the ability to submit various queries (e.g., prompts) that are evaluated and answered in real-time. For example, AI chatbots have been developed over time to simulate human conversation. It should be noted that "AI chatbot" is an umbrella term which refers to different types of AI-based interfaces that can provide responses to various prompts or queries that are entered. In other words, AI chatbots may include any AI based software applications that aim to mimic human conversation using text or voice interactions to respond to prompts that are submitted by users. These interactions typically extend across an online connection and involve AI systems that are capable of maintaining a conversation with the users.

AI based models have traditionally been limited to single source models. Conventional products have thereby traditionally only been able to satisfy relatively simple prompts. However, as user submissions become more complex over time, these conventional products have been forced to process the more complex prompts for longer amounts of time, thereby increasing resource consumption in an attempt to remain relevant. While this maintains operation at the expense of efficiency, single source models have finite capabilities, particularly in applications that involve responding to queries that are expressed in a variety of different languages.

SUMMARY

A method, according to one approach, includes: causing a received query to be translated from a first language to a second language. The method also includes generating potential answers for the translated query, and extracting features from the translated query. The method also includes causing the extracted features to be converted into feature vectors. The method also includes causing the feature vectors to be compared against existing vectors in a knowledge base that correspond to past question-answer pairs. The method also includes causing the potential answers to be ranked based at least in part on an outcome of comparing the feature vectors against the existing vectors in the knowledge base. Furthermore, the method includes causing a final answer to be generated based at least in part on the ranked potential answers.

A computer program product, according to another approach, includes: one or more computer-readable storage media. The computer program product also includes program instructions that are stored on the one or more storage media to perform the foregoing method.

A computer system, according to yet another approach, includes: a processor set, and one or more computer-readable storage media. The computer system also includes program instructions that are stored on the one or more storage media to cause the processor set to perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
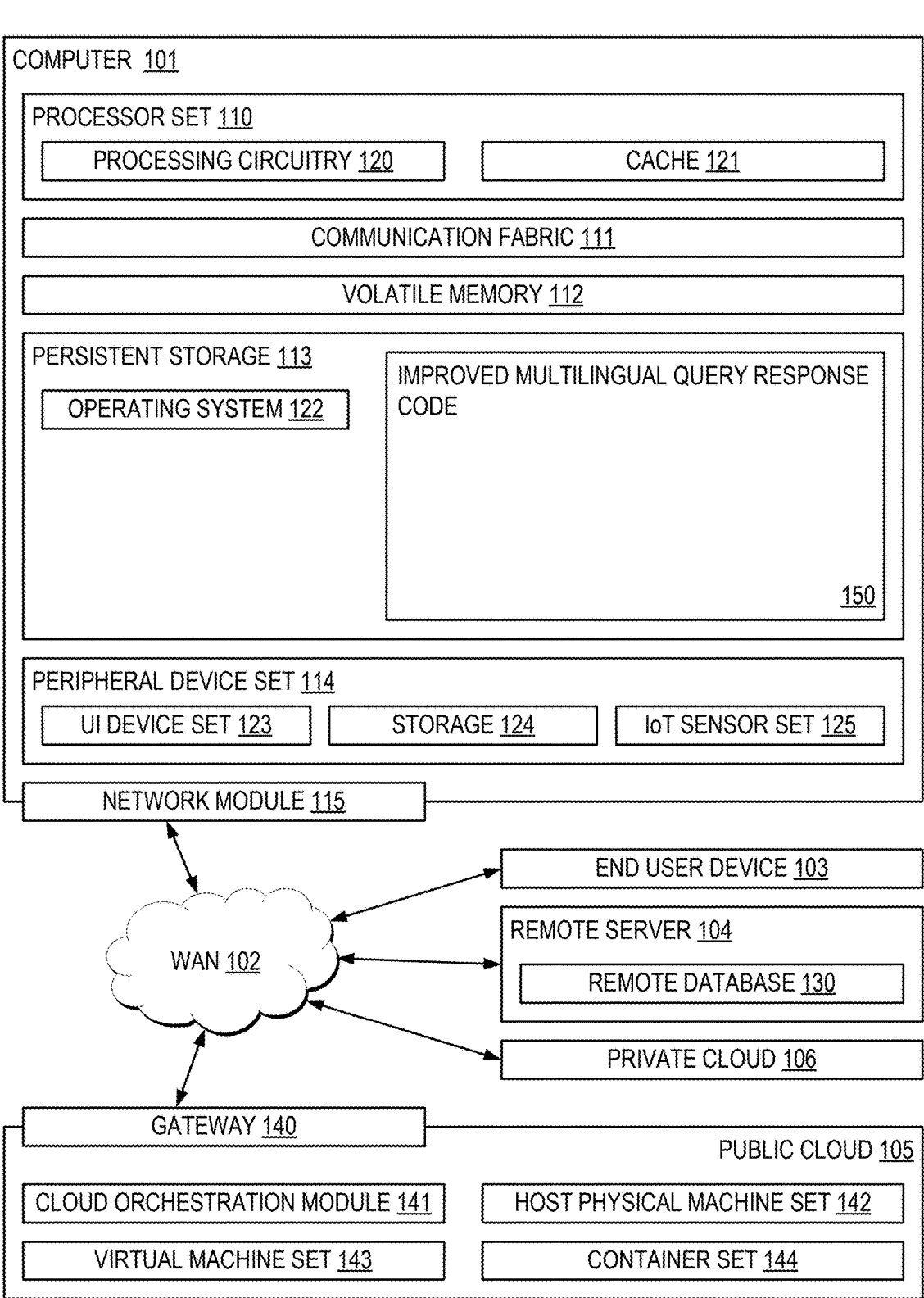
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for improving the accuracy and efficacy with which queries may be automatically processed regardless of the language they are expressed (e.g., presented) in is illustrated in accordance with various aspects of the present invention. Such languages may be human communication languages such as English, Spanish, German, French, etc., and/or dialects thereof. Approaches herein thereby include maintaining and applying a context-aware multilingual models to automatically evaluate received user queries and generate responses thereto, e.g., as will be described in further detail below.

In one general approach, a method includes: causing a received query to be translated from a first language to a second language. The method also includes generating potential answers for the translated query, and extracting features from the translated query. The method also includes causing the extracted features to be converted into feature vectors. The method also includes causing the feature vectors to be compared against existing vectors in a knowledge base that correspond to past question-answer pairs. The method also includes causing the potential answers to be ranked based at least in part on an outcome of comparing the feature vectors against the existing vectors in the knowledge base. Furthermore, the method includes causing a final answer to be generated based at least in part on the ranked potential answers.

In another general approach, a computer program product includes: one or more computer-readable storage media. The computer program product also includes program instructions that are stored on the one or more storage media to perform the foregoing method.

In yet another general approach, a computer system includes: a processor set, and one or more computer-readable storage media. The computer system also includes program instructions that are stored on the one or more storage media to cause the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved multilingual query response code at block 150 for improving the accuracy and efficacy with which queries may be automatically processed regardless of the language they are expressed (e.g., presented) in is illustrated in accordance with one approach. Approaches herein thereby include maintaining and applying a context-aware multilingual models to automatically evaluate received user queries and generate responses thereto, e.g., as will be described in further detail below. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, AI based models have emerged in recent years, providing users the ability to submit various requests (e.g., prompts) that are evaluated and answered in real-time. For example, AI chatbots have been developed over time to simulate human conversation. It should be noted that "AI chatbot" is an umbrella term which refers to different types of AI-based interfaces that can provide responses to various prompts or queries that are entered. In other words, AI chatbots may include any AI based software applications that aim to mimic human conversation using text or voice interactions to respond to prompts that are submitted by users. These interactions typically extend across an online connection and involve AI systems that are capable of maintaining a conversation with the users.

AI based models have traditionally been limited to single source models.

Conventional products have thereby traditionally only been able to satisfy relatively simple prompts. However, as user submissions become more complex over time, these conventional products have been forced to process the more complex prompts for longer amounts of time, thereby increasing resource consumption in an attempt to remain relevant. While this maintains operation at the expense of efficiency, single source models have finite capabilities.

For instance, a main challenge experienced by conventional multilingual question-answering systems is ensuring the answers are correct regardless of the language(s) used. The process of translating between languages is a complex process, at least in part because each language has unique features, making it significantly difficult to reliably verify if a provided answer is correct. Languages are also constantly evolving, shifting how individuals communicate and introducing new words over time.

Additionally, user expectations vary which introduces still further complexity. Conventional products that support searching for information in various different languages have thereby experienced significant setbacks in operational efficiency and efficacy, resulting in inaccurate answers being produced.

As the reliance on multilingual question-answering systems to produce reliable information continues to increase, having a standard and flexible way to check if the answers are correct becomes increasingly important. Moreover, the gap between what users expect and what conventional products are able to achieve continues to widen, emphasizing the need for a model that is able to generate answers that are correct and contextually relevant, regardless of what language a query is entered in.

In sharp contrast to these shortcomings, approaches herein are desirably able to develop, manage, and leverage historical question-answer modeling as well as correlated vector embeddings to ensure accurate responses are generated by incorporating rich knowledge from past interactions. Moreover, using a multi-language translator and feature extraction enable seamless adaptation of the approaches herein to various languages, providing precise corrections for diverse user queries. The vector database combined with similarity scoring further streamlines the identification of relevant historical question-answer pairs, contributing to quick and accurate matching. Combining similarity scores and correction degrees also enables personalized answer ranking, prioritizing contextually relevant and historically accurate responses. Furthermore, continuous updates to the vector database and correction degree model create a dynamic system that refines its correction abilities over time, ensuring ongoing accuracy and relevance, e.g., as will be described in further detail below.

Figure 2A:
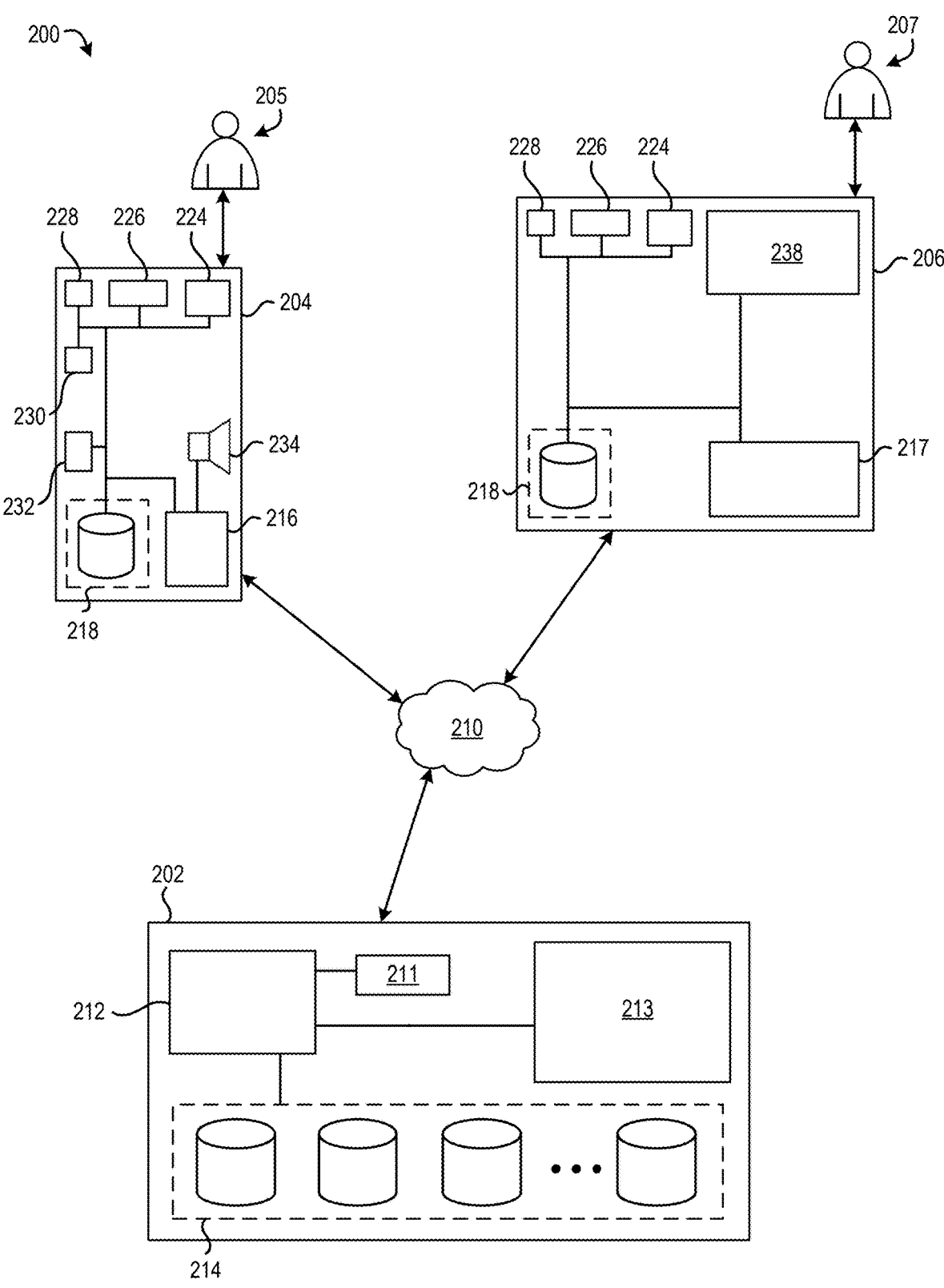
FIG. 2A is a representational view of a distributed system, in accordance with one approach.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to a user device 204, and edge node 206 accessible to the user 205 and administrator 207, respectively. The user device 204 and edge node 206 may thereby be considered "endpoint devices," each of which are connected to the central server 202. The central server 202, user device 204, and edge node 206 are each connected to a network 210, and may thereby be positioned in different geographical locations. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between user device 204, edge node 206, and/or central server 202, regardless of the amount of separation which exists therebetween, e.g., despite being positioned at different geographical locations. According to some approaches, the central server 202 is a remote cloud server that is connected to (e.g., may be accessed by) user device 204 and/or edge node 206.

However, it should be noted that two or more of the user device 204, edge node 206, and central server 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc.; etc., or any other type of connection which would be apparent to one skilled in the art after reading the present description.

The terms "user" and "administrator" are in no way intended to be limiting either. For instance, while users and administrators may be described as being individuals in various implementations herein, a user and/or an administrator may be an application, an organization, a preset process, etc. The use of "data," "datasets," and "information" herein are in no way intended to be limiting either, and may include any desired type of details, e.g., depending on the type of operating system implemented on the user device 204, edge node 206, and/or central server 202. In some approaches, datasets of textual entries (e.g., strings of alphanumeric characters) that are generated at the edge node 206 may be kept at the edge node 206 to ensure data security and retention. For example, datasets having sensitive information (e.g., personal data, financial data, intellectual property, etc.) may intentionally be retained at an edge node 206 where the datasets were formed. However, other information deemed as not being sensitive may be sent to the central server 202 from user device 204 and/or edge node 206 for processing using one or more machine learning models.

With continued reference to FIG. 2A, the central server 202 includes a large (e.g., robust) processor 212 coupled to a cache 211, an AI module 213, and a data storage array 214 having a relatively high storage capacity. The AI module 213 may include any desired number and/or type of AI-based models, e.g., such as machine learning models, deep learning models, neural networks, etc. In preferred approaches, the AI module 213 may include one or more historical question-answer modelers that are able to automatically analyze historical question-answer pairs and extract features that capture the characteristics and properties of diverse interactions for various different languages. The question-answer modelers may thereby at least assist with generating, training, outputting, incrementally re-training over time, etc., one or more AI based models that are configured to improving the accuracy and efficacy with which multilingual queries may be automatically processed, e.g., as will be described in further detail below.

The AI module 213 also preferably includes one or more question-answer vector embeddings that are formed by converting the features extracted by the historical modelers into vector representations (e.g., embeddings), thereby allowing for efficient query response retrieval and generation. It should be noted that a "question-answer pair" as used herein refers to: a question (also referred to herein as a "query"), and the corresponding "best" answer which is contextually relevant to the question and historically accurate based on past question-answer pairs that have been processed or are otherwise known (e.g., learned). It follows that AI module 213 and/or processor 212 may be used to perform one or more of the operations in method 300 below to answer a user query in a most efficient and accurate way possible, e.g., as will be described in further detail below.

With continued reference to FIG. 2A, user device 204 includes a processor 216 which is coupled to memory 218. The processor 216 receives inputs from and interfaces with user 205. For instance, the user 205 may input information and/or queries using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Queries may be submitted by user 205 using user device 204 and central server 202. For instance, queries that involve non-sensitive topics and/or data may be received from user 205 through user device 204 for evaluation using AI module 213 at central server 202. The queries may be received as a result of the user 205 using one or more applications, software programs, temporary communication connections, etc. running on the user device 204. For example, the user 205 may use user device 204 to enter (e.g., type) and upload a query to be evaluated and solved using processor 212 and/or AI module 213 of central server 202. As a result, context-aware multilingual models at the central server 202 may be developed and trained to efficiently evaluate and process even complex queries regardless of the language the queries are expressed in, e.g., as will be described in further detail below.

Looking now to the edge node 206, some of the components included therein may be the same or similar to those included in user device 204, some of which have been given corresponding numbering. For instance, controller 217 is coupled to memory 218, a display screen 224, keys of a computer keyboard 226, and a computer mouse 228. Additionally, the controller 217 is coupled to an AI module 238. As described above with respect to AI module 213, the AI module 238 may include one or more historical question-answer modelers that are able to automatically analyze historical question-answer pairs and extract features that capture the characteristics and properties of diverse interactions for various different languages. The question-answer modelers may thereby at least assist with generating, training, outputting, incrementally re-training over time, etc., one or more AI based models that are configured to improving the accuracy and efficacy with which multilingual queries may be automatically processed. The AI module 238 also preferably includes one or more question-answer vector embeddings that are formed by converting the features extracted by the historical modelers into vector representations (e.g., embeddings), thereby allowing for efficient query response retrieval and generation. It follows that AI module 238 and/or controller 217 may be used to perform one or more of the operations in method 300 below to answer user queries in a most efficient and accurate way possible, e.g., as will be described in further detail below.

Figure 2B:
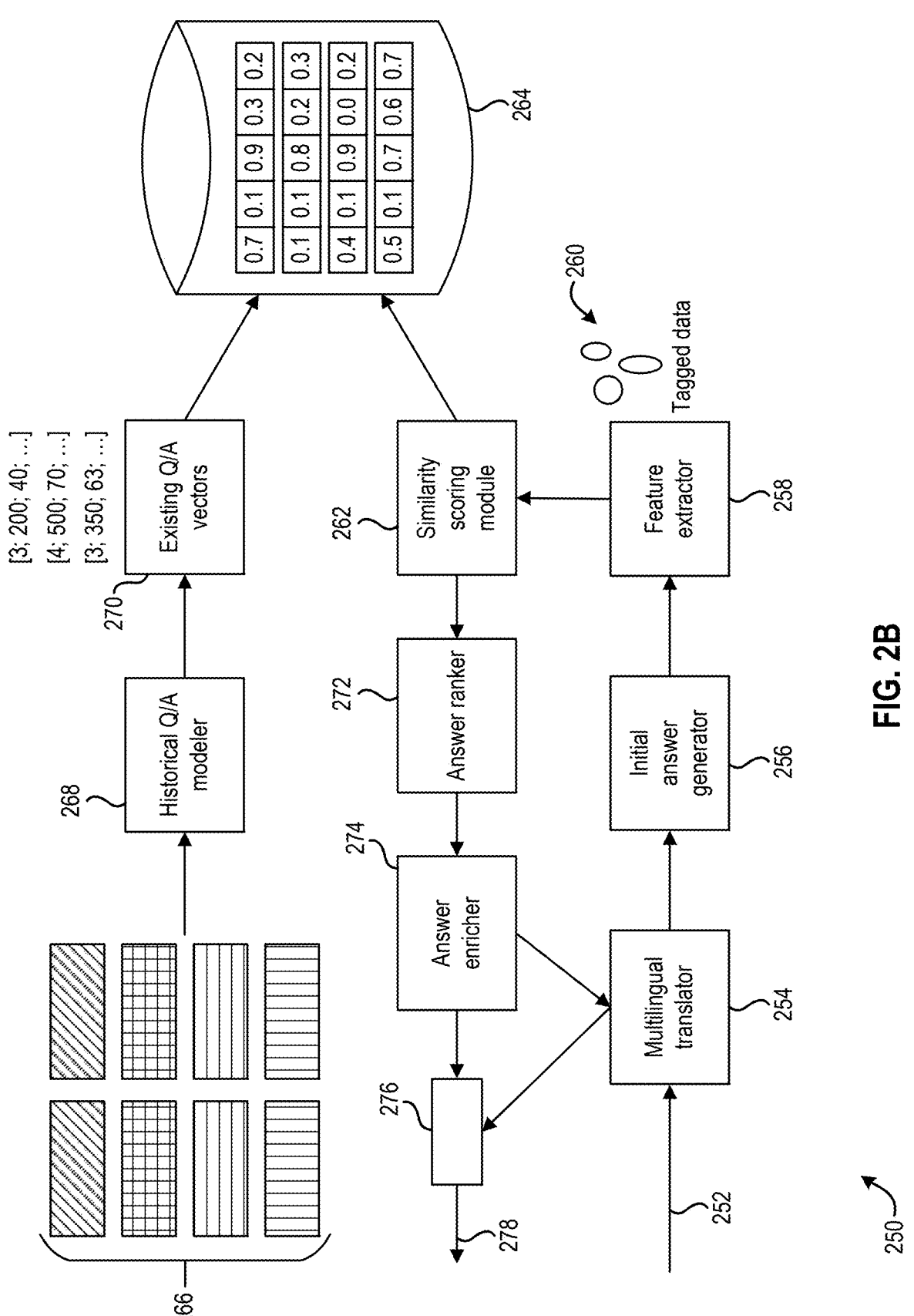
FIG. 2B is a representational diagram of processing a received query, in accordance with one approach.

Looking now to FIG. 2B, a representational diagram 250 of processing a received query is illustrated in accordance with one approach which is in no way intended to be limiting. It follows that any details of the diagram 250 presented herein may be included in and implemented by AI module 213 and/or 238 of FIG. 2A to satisfy received multilingual user queries, e.g., as would be appreciated by one skilled in the art after reading the present description.

As shown, a query 252 is received at a multilingual translator 254. Queries may typically be received from users that are seeking a correct answer, but in other approaches the query may be received from a running application, generated by one or more AI based models, produced automatically in response to a predetermined condition being made, preset based on industry standards, etc. Moreover, the query 252 may be received in a number of different forms, e.g., depending on how it was submitted. In some approaches the query may be received as static text (e.g., alphanumeric characters) that corresponds to a particular language. For example, a user may type out the query in a text field of a graphical user interface on their personal electronic device (e.g., mobile phone, laptop computer, etc.) and submit the query for a response. In other approaches, the query may be received as an analog and/or digital signal that captures words spoken by a user submitting the query. For example, a user may vocalize their query within range of a microphone that captures the audio signals and transmits them to the multilingual translator 254. It should also be noted that in some approaches, the multilingual translator 254 may convert the received query to a different form than in which it was received. In other words, the multilingual translator 254 may translate audio recordings of a query being vocalized by a user, into a textual representation of the words originally spoken by the user. In another example, a picture of a handwritten query may be converted into searchable and modifiable characters, e.g., using optical character recognition.

In response to receiving the query 252, the multilingual translator 254 may be used to evaluate the query 252 and determine what language the query is presented in. In other words, the multilingual translator 254 identifies the language used to express the query as received. As noted above, approaches herein may be utilized to improve the efficiency and efficacy with which queries are fielded, regardless of what language they are expressed in. Thus, by initially evaluating the query, the multilingual translator 254 may be able to identify specific characters, grammatical structures, specific words or groupings of words, syntax, etc., that reveal the specific language(s) in which the query is expressed.

While approaches herein are desirably able to field queries presented in any desired (or supported) language, the query itself is preferably processed—and an answer generated—in a specific language. In other words, the approaches herein may be configured to operate in a predetermined language. Thus, by identifying the language the query is originally submitted in, the multilingual translator 254 is able to determine whether any translations should be performed. According to an example, which is in no way intended to be limiting, a user may submit (e.g., type, speak, etc.) a query that is expressed in a first language, such as Chinese, Japanese, German, etc. Thus, in response to receiving the query, the multilingual translator 254 may evaluate the query and determine that it is presented in the first language. While the multilingual translator 254 may be able to comprehend the content of the query expressed in the first language, remaining components in the system may not be equipped to comprehend and/or process the first language. It follows that in response to identifying that the received query is expressed in first language, the multilingual translator 254 may automatically translate the query into a predetermined second language (e.g., English, French, Spanish, etc.) that a remainder of the system is able to comprehend and work with.

From the multilingual translator 254, the query is passed to an initial answer generator 256. There, the initial answer generator 256 evaluates the content of the query and generates an initial attempt at responding to the query. In some approaches, the initial answer generator 256 compares the query to other queries that have recently been received and responded to. For instance, responses to a predetermined number of the latest queries may be stored in cache. This allows for the initial answer generator 256 to produce first attempts at solving the query without accessing the knowledge base 264. These initial attempts may also be used to identify certain portions of the knowledge base 264 to inspect with further detail.

In some approaches, the initial answer generator 256 may develop an understanding of the received query by first converting it into a desired format before developing a contextual understanding of the user query. According to an example, which is in no way intended to be limiting, an audio signal corresponding to a verbal user query may be converted into text before being evaluated with one or more large language models. Outputs from the large language models may further be used by one or more trained AI models to generate the initial attempts at solving the query.

In some approaches, the initial answer generator 256 is configured to inspect the user query and determine whether the query includes any malicious activity. Depending on the approach, "malicious activity" may include queries that implement injection techniques attempting to retrieve confidential data, hallucinogenic queries tailored to abuse model functionality, etc., and other malformed requests. In situations where the received user query is identified as including malicious activity, the query is ignored (e.g., failed) and no answer is provided. In some approaches, a warning and/or error message may be output to the user the provided the rejected query, to an administrator to alert them of malformed requests, to a storage location to record the rejected request for future evaluation, etc., as indicated by the dashed line.

From the initial answer generator 256, the query and the initial one or more potential answers are sent to a feature extractor 258. In response to receiving the user query, the feature extractor 258 identifies and removes information from the query and/or the potential answers to gain a better understanding of what the user is actually requesting. For instance, the feature extractor 258 may extract subjects, verbs, modifiers, objects, etc., or any other components of the query that provide insight as to what is being requested. At least some of these components may be extracted as a result of a textual representation of the user query being processed (e.g., evaluated) using one or more large language models. In some approaches, the multilingual translator 254 implements AI based models that are trained (and even re-trained over time using incoming queries) to evaluate user queries and develop a contextual understanding of each.

In addition to extracting features from the received query and/or potential answers, the feature extractor 258 may enrich the information included in the extracted features. For instance, the feature extractor 258 may add tags, metadata headers, flags, etc. that add supplemental information to the already extracted features. Accordingly, the feature extractor 258 is illustrated as ultimately producing tagged data 260.

With continued reference to FIG. 2B, this tagged data 260 (preferably along with the received query and the potential answers) is sent to a similarity scoring module 262. There, the similarity scoring module 262 may compare the received information to historical question-answer pairs. In other words, the similarity scoring module 262 is configured to compare details about the current query with details of various other queries that have been solved in the past, and quantify how similar the past (also referred to herein as "historical") queries are to the current query and/or how similar the past answers to those queries are to the potential answers produced by the initial answer generator 256.

As shown, the similarity scoring module 262 does this by comparing the information associated with the received query (e.g., such as the extracted features or tagged data 260, the potential answers, information known about the user, etc.) with and at least some of the entries in a knowledge base 264. The knowledge base 264 includes a variety of entries, each of which correspond to a respective query as well as the answer that was ultimately given to the query. As noted above, these combinations of past queries and answers are referred to herein as historical question-answer pairs. Comparing a current query to the previously satisfied queries allows for connections to be made therebetween. These connections may further be utilized to identify previously provided answers that may serve as viable answers to the present query, thereby significantly reducing the compute overhead associated with generating a response to the query.

The similarity scoring module 262 thereby calculates a similarity score that quantifies the level of similarity between the extracted features (e.g., tagged data 260) and at least some of the entries in the knowledge base 264. In some approaches, the similarity scoring module 262 calculates the cosine similarity between the extracted features and at least some of the entries in the knowledge base 264. In other approaches, the similarity scoring module 262 calculates the cosine similarity between the potential answers produced by the initial answer generator 256, and at least some of the entries in the knowledge base 264.

The question-answer pairs may be represented in the knowledge base 264 in any desired manner. For instance, in some approaches features are extracted from the question-answer pairs and are converted into feature vectors (e.g., numerical representations or embeddings) that provide a condensed version of the information included in the respective question-answer pairs. Accordingly, each row of the knowledge base 264 may include numerical representations that represent vectors extracted from a given historical question-answer pair.

The knowledge base 264 is formed by evaluating a plurality of past queries and how they were answered to build an understanding of how language, context, subject matter, complexity, etc. impact how a given query is answered, along with how accurate the answer ultimately is. Accordingly, a repository of historical question-answer pairs along with other related multilingual context 266 is received and processed by a historical question-answer (Q/A) modeler 268.

The historical modeler 268 is preferably configured to analyze the past question-answer pairs and extract features therefrom. Moreover, the features extracted from the past question-answer pairs are preferably converted into existing question-answer vectors (e.g., embeddings) 270. The existing vectors 270 are preferably used to form a vector database in the knowledge base 264. For instance, in some approaches the features and/or corresponding vectors extracted from the multilingual context 266 are used to build and train a historical question-answer model that is configured to capture characteristics and properties of diverse language interactions. In other words, the existing vectors 270 taken from the various multilingual context 266 may be used to train one or more AI based models to automatically analyze historical question-answer pairs and extract features that capture the characteristics and properties of diverse interactions for various different languages. The historical modeler 268 may thereby at least assist with generating, training, outputting, incrementally re-training over time, etc., one or more AI based models that are configured to improving the accuracy and efficacy with which multilingual queries may be automatically processed.

Figure 2C:
FIG. 2C is a representational diagram of developing a knowledge base, in accordance with one approach.
Figure 2C:
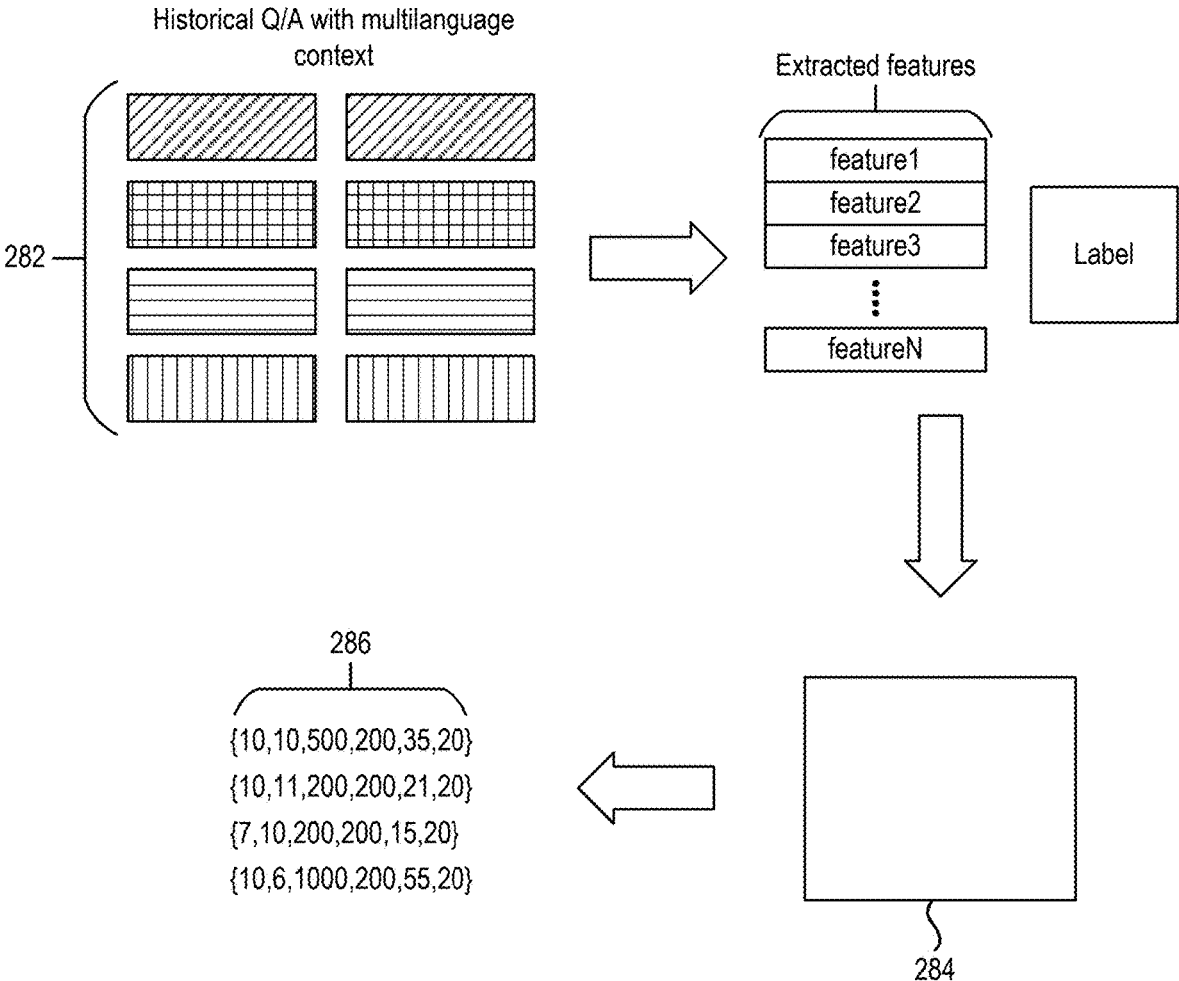

Referring momentarily to FIG. 2C, a representational diagram 280 of developing a knowledge base is illustrated in accordance with one approach, which is in no way intended to be limiting. It follows that any details of the diagram 280 presented herein may be included in and implemented by AI module 213 and/or 238 of FIG. 2A to develop a repository that is used as a reference while developing responses that are sent to satisfy received multilingual user queries, e.g., as would be appreciated by one skilled in the art after reading the present description.

As shown, a repository of historical question-answer pairs along with other related multilingual context 282 is received. The question-answer pairs and related multilingual context 282 may be received from a training data source (e.g., repository), saved from previously satisfied queries, provided by one or more users as preferred settings, etc. The question-answer pairs and multilingual context 282 thereby provides valuable insight into a plurality of past queries and how they were answered. The relationships between the various past queries and answers provided can thereby be used to build an understanding of how language, context, subject matter, complexity, etc., impact how a given query is answered. This information may also be evaluated to determine how accurate a produced answer ultimately is given the initial question.

Features 1-N are extracted from the question-answer pairs and multilingual context 282. As noted above, the features that are extracted preferably capture the characteristics and properties of diverse interactions for various different languages. These features may thereby be used to understand different queries in further detail. Labels may also be attached to one or more of the features, providing additional context for the AI model(s) that are trained using the information extracted from the question-answer pairs and multilingual context 282.

The extracted features and labels are transferred to the historical modeler 284 which is preferably configured to analyze the past question-answer pairs and extract features therefrom. Moreover, the features extracted from the past question-answer pairs are converted into vectored features 286 (also referred to herein as "feature vectors"). In some approaches, the features of historical question-answer pairs are transformed into a numerical representation using vector embeddings and dimensionality reduction algorithms. Moreover, these embeddings may be extracted from the preprocessed data by employing statistical analysis to identify and capture the pertinent characteristics and properties of the language interactions. These embeddings may further be used to construct a model that incorporates the embeddings and enhance the representation of the historical Q/A dataset. The generated embeddings for each historical question-answer pair may be stored in the vector database, which facilitates efficient querying and retrieval of embeddings, providing a foundation for subsequent steps in the multilingual question-answering system.

In some approaches, the vectored features are used to form a vector database. For instance, in some approaches the features and/or corresponding vectors extracted from the multilingual context 282 are used to build and train a historical question-answer model that is configured to capture characteristics and properties of diverse language interactions. In other words, the vectored features 286 extracted from the multilingual context 282 may be used to train one or more AI based models to automatically analyze historical question-answer pairs and extract features that capture the characteristics and properties of diverse interactions for various different languages. The historical modeler 268 may thereby at least assist with generating, training, outputting, incrementally re-training over time, etc., one or more AI based models that are configured to improving the accuracy and efficacy with which multilingual queries may be automatically processed.

In some approaches, the process of evaluating relationships between various past queries and answers provided to build an understanding of how language, context, subject matter, complexity, etc., impact how a given query is answered may be performed by an AI model that is trained using a predetermined training set of data. Moreover, the process of determining how accurate a produced answer (response) ultimately is given the initial question and using that determination to generate new responses to new queries may be performed by an AI model that is trained using a predetermined training set of data. For example, in some approaches, various of the operations (e.g., steps) noted herein may be deployed in a trained state of a trained AI model. Training of the AI model, in some approaches, may be performed by applying a predetermined training data set to learn how to evaluate relationships between various past queries and answers provided to build an understanding of how language, context, subject matter, complexity, etc., impact how a given query is answered. Training of the AI model, in some approaches, may be performed by applying a predetermined training data set to learn how to identify the accuracy of a produced answer (response) given the initial question and use that determination to generate new responses to new queries. Initial training may include reward feedback that may, in some approaches, be implemented using a subject matter expert (SME) that generally understands how queries are automatically and autonomy (without input from a user) generate responses to new and unique queries. However, to prevent costs associated with relying on manual actions of a SME, in another approach, reward feedback may be implemented using techniques for training a BERT model, as would become apparent to one skilled in the art after reading the present disclosure. Once a determination is made that the AI model achieves a redeemed threshold of accuracy of performing the operations described herein during this training, a decision that the model is trained and ready to deploy for performing techniques and/or operations of the approaches herein (e.g., see FIGS. 2B and/or 3) may be performed. In some further approaches, the AI model may be a neuromyotonic AI model that may improve performance of computer devices in an infrastructure associated with efficiently and effectively generating responses to received queries, because the neuromyotonic AI model may not need an SME and/or iteratively applied training with reward feedback in order to accurately perform operations described herein. Instead, the neuromyotonic AI model is configured to itself make determinations described in operations herein.

Weight values may, in some approaches, be used by the AI reasoning model to collect and analyze information and/or feedback potentially received in response to generated answers being provided. Such an AI model ensures that re-training occurs, during which the accuracy of the answers generated by the AI model(s) is evaluated. In situations where the accuracy of the generated answers decline, the question-answer pairs and related multilingual context used to train the AI model(s) may be shifted (e.g., weighted) such that the AI model(s) produce more accurate answers to received queries as a result of the re-training, where the scale of such analysis and determinations would not otherwise be feasible for a human to perform. This is because humans are not able to efficiently perform complex re-training resulting from dynamic evaluation of generated answers to complex queries, and would otherwise incorporate processing delays and errors in the process of attempting to do so. Accordingly, management of operations described herein is not able to be achieved by human manual actions.

Referring back now to FIG. 2B, the similarity scoring module 262 is able to compare feature vectors of incoming queries with vectors in the knowledge base 264 to identify historical question-answer pairs that are sufficiently similar to the incoming queries. By quantifying (e.g., measuring) how closely an incoming query matches historical data in the various entries of the knowledge base 264, approaches herein are desirably able to identify potential answers to the query that may be utilized at least in part to produce a final correct answer to a received query. The similarity scoring module 262 may calculate the similarity score between a received query and a given question-answer pair in the knowledge base 264 by calculating cosine similarity values between the feature vectors extracted from the received query and the question-answer pair. In other approaches, the similarity scoring module 262 may determine how similar a query is to a given question-answer pair by comparing lengths, subject matter, complexity, grammatical structure, source language, etc. of the query and question from the question-answer pair.

Given two vectors A and B, the cosine similarity cos (0) may be calculated using the formula below.

$$\text{Cosine Similarity} = \frac{A \cdot B}{\|A\|\|B\|}$$

Here, $A \cdot B$ is the dot product of vectors "A" and "B", while $\|A\|\|B\|$ are the magnitudes (e.g., norms) of vectors "A" and "B," respectively. According to an example, which is in no way intended to be limiting, the vectors representing an incoming question Q (English) and a possible answer in French (A1, French): $Q_{(English)}$=[0.1, 0.2, −0.3, 0.4, −0.5] and A1, French=[0.2, −0.3, 0.4, −0.5, 0.6]. The dot product calculation is represented as $A \cdot B$=(0.1×0.2)+(0.2×−0.3)+(−0.3×0.4)+(0.4×−0.5)+(−0.5×0.6). Moreover, the magnitude calculations are represented as:

$$\|Q_{(English)}\| = \sqrt{0.1^2 + 0.2^2 + (-0.3)^2 + 0.4^2 + (-0.5)^2}$$

$$\|A1, French\| = \sqrt{0.2^2 + (-0.3)^2 + 0.4^2 + (-0.5)^2 + 0.6^2}$$

Accordingly, the cosine similarity calculation for the given example may be expressed as:

$$\text{Cosine Similarity} = \frac{A \cdot B}{\|Q_{(English)}\|\|A1, French\|}$$

From the similarity scoring module 262, the progression advances to an answer ranker 272. There, the answer ranker 272 is preferably configured to prioritize ones of the potential answers based at least in part on the similarity scores determined by the similarity scoring module 262. The answer ranker 272 may also take a degree of historical correction into consideration while ranking the various potential answers. In other words, the answer ranker 272 may rank at least some of the potential answers by considering how closely they match historical question-answer pairs, while also considering how often the answers in the historical Q/A pairs have been corrected in the past. In some approaches, the answer ranker 272 may send a result of the ranking to the similarity scoring module 262. This may allow the similarity scoring module 262 to update which question-answer pairs are suggested as potential matches to incoming queries, e.g., based on how potential answers were previously received.

With continued reference to FIG. 2B, the ranked question-answer pairs are sent from the answer ranker 272 to the answer enricher 274. There, the answer enricher 274 is configured to enhance at least some of the ranked question-answer pairs with additional context or information for a more detailed and contextually appropriate response. In other words, the answer enricher 274 has been trained over time to add relevant details to selected answers, thereby improving the context and overall quality of the available answers. In some approaches, the answer enricher 274 combines portions of two or more ranked question-answer pairs to create a "enriched" option that may be used to produce a response to the received query. The answer enricher 274 may thereby include one or more AI based models that are trained to evaluate how often each of the ranked question-answer pairs are utilized and/or modified by a requesting user. For example, a user that originally submitted the query may be questioned after a final answer is provided, asking for feedback on whether the provided final answer was sufficiently detailed, correct, formatted, etc. Any feedback received from the user may thereby be evaluated by the answer enricher 274 and incorporated into the process of selecting, ranking, and/or enriching (e.g., decorating) answers taken from the question-answer pairs identified in the knowledge base 264.

As shown, the enriched and ranked answers may be sent from the answer enricher 274 to the multilingual translator 254 to be translated before being sent to the user that submitted the query. As noted above, while the initial query may be expressed in a source language, it may be more desirable that the query itself and potential answers are evaluated and generated in one or more different languages. The knowledge base 264 includes question-answer pairs that are in a number of different languages. While this desirably allows for stronger connections to be developed between a received query and one or more of the question-answer pairs, it follows that the final answer that is produced may need to be translated back into the initial language. However, in situations that the produced answer is already in the same language as the initial query, the multilingual translator 254 may be circumvented as shown.

Looking now to the final answer generator 276, there the ranked and enriched potential answers that have been translated are evaluated and used to produce a final answer to the initial query. The final answer generator 276 is preferably configured to evaluate corrections, context, and any additional information that is associated with the potential answers, and produce a precise and linguistically nuanced final response 278 to the query. The final answer generator 276 may include one or more AI based models that are configured to evaluate the potential answers and select one or more to use in generating the final response 278 to the received query 252. In some approaches, the final response 278 is the same or similar to one of the question-answer pairs from the knowledge base 264. In other approaches, the final response 278 combines two or more of the question-answer pairs from the knowledge base 264. In still other approaches, the final response 278 combines two or more of the question-answer pairs from the knowledge base 264 with a newly generated (e.g., unique) response addressing portions of a received query that do not match entries in the knowledge base 264.

Figure 3:
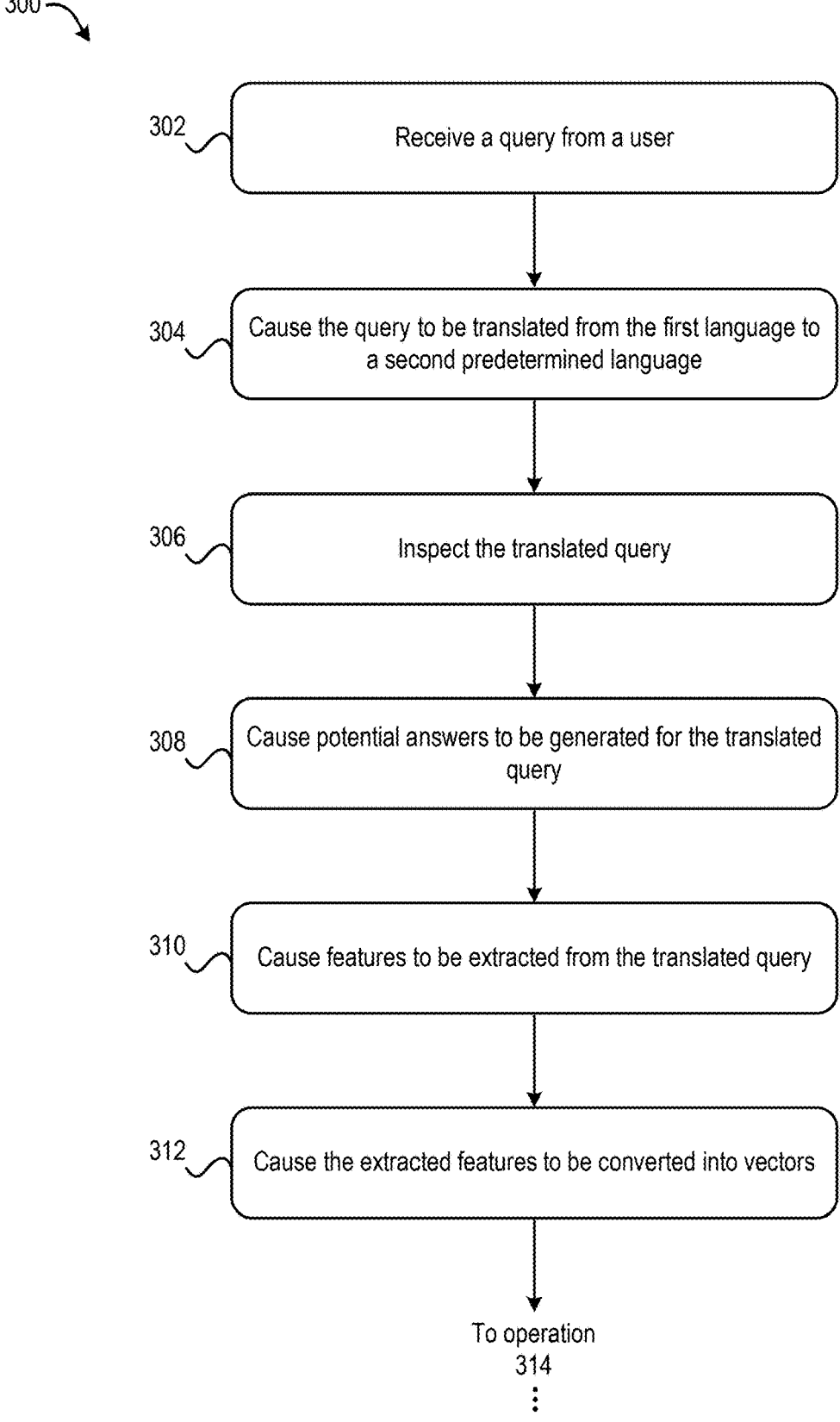
FIG. 3 is a flowchart of a method, in accordance with one approach.

Looking now to FIG. 3, a flowchart of a computer-implemented-method 300 for improving the accuracy and efficacy with which multilingual queries may be automatically processed is illustrated in accordance with one approach. In other words, method 300 includes maintaining and applying a context-aware multilingual models to automatically evaluate received user queries and generate responses thereto. The method 300 may be performed in accordance with the present invention in any of the environments depicted in FIGS. 1-2B, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in some approaches one or more of the operations in method 300 may be performed by a context-aware multilingual model which may be implemented in an AI based module (e.g., see AI modules 213, 238 of FIG. 2A). However, the method 300 may be partially or entirely performed by a controller, a processor, a computer, etc., or some other device having one or more processors therein. Moreover, the terms computer, processor and controller may be used interchangeably with regards to any of the embodiments herein, such components being considered equivalents in the many various permutations of the present invention.

For those embodiments having a processor, the processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown, operation 302 includes receiving a query from a user. The query may thereby be received from an endpoint device in some approaches, e.g., which may include a user device (e.g., laptop, mobile phone, tablet, etc.), an edge node, a dedicated user interface, etc. Accordingly, the user query may be received from any number of locations. The type and/or complexity of user query that is received may also vary depending on the situation. For example, responding to some user queries may involve providing a more detailed and/or specific type of response in comparison to less complex and/or different types of queries.

In addition to having varying complexity, the query may be expressed in different languages, e.g., depending on the user, subject matter associated with the query, style of query, etc. While the query received at operation 302 may be expressed in a first (or original) language, it may be desirable for the query to be translated into a second language for evaluation and processing. For example, one or more AI based models may be primarily trained using a desired language. Thus, translating queries into the desired language may allow for the AI models to evaluate the queries and generate responses more efficiently. Accordingly, operation 304 includes causing the query to be translated from the first language to a second predetermined language. In other words, operation 304 may include sending one or more instructions to a multilingual translator that ultimately cause the query to be converted into the second language.

From operation 304, method 300 advances to operation 306. There, operation 306 includes inspecting (e.g., evaluating) the translated query. Moreover, operation 308 includes causing potential answers to be generated for the translated query. The translated query is preferably evaluated using an initial answer generator, which is configured to produce answers that serve as a first attempt to satisfy the query. As noted above, the initial answer generator may develop an understanding of the received query by first converting it into a desired format before developing a contextual understanding of the user query (e.g., see initial answer generator 256 of FIG. 2B). According to an example, which is in no way intended to be limiting, an audio signal corresponding to a verbal user query may be converted into text before being evaluated with one or more large language models. Outputs from the large language models may further be used by one or more trained AI models to generate the initial attempts at solving the query.

From operation 308, method 300 advances to operation 310. There, operation 310 includes causing features to be extracted from the translated query. In preferred approaches, a feature extractor is used to identify and remove features from the translated query (e.g., see feature extractor 258 of FIG. 2B). As noted above, the process of identifying and extracting features desirably allows for a better understanding of what the user is actually requesting to be developed. For instance, a feature extractor may extract subjects, verbs, modifiers, objects, etc., or any other components of the query that provide insight as to what is being requested. At least some of these components may be extracted as a result of a textual representation of the user query being processed (e.g., evaluated) using one or more large language models. Moreover, AI based models that are trained (and even re-trained over time using incoming queries) to evaluate user queries and develop a contextual understanding of each may be used at least in part.

In addition to extracting features from the received query and/or potential answers, the feature extractor may enrich the information included in the extracted features. For instance, the feature extractor may add tags, metadata headers, flags, etc. that add supplemental information to the already extracted features. Proceeding to operation 312, there method 300 includes causing the extracted features to be converted into feature vectors. In other words, operation 312 includes sending one or more instructions that cause the extracted features to be translated into embeddings (e.g., numerical representations).

Furthermore, operation 314 includes causing the feature vectors of the received query to be compared against existing vectors in a knowledge base that correspond to past question-answer pairs. In other words, operation 314 includes comparing details about the current query with details of various other queries that have been solved in the past. At least some of the past question-answer pairs in the knowledge base are expressed in languages that are different than the first and second languages. In other words, the past (e.g., "historical") question-answer pairs in the knowledge base are expressed in multiple different languages (e.g., "multilingual").

As noted above, the knowledge base may be formed by analyzing a number of past question-answer pairs. Features may be extracted from the past question-answer pairs and used to build a historical question-answer model that is configured to capture characteristics and properties of diverse language interactions. Moreover, the features extracted from the past question-answer pairs are preferably converted into the existing vectors (e.g., embeddings) that form the vector database in the knowledge base.

With continued reference to FIG. 3, method 300 advances from operation 314 to operation 316. There, operation 316 includes causing the potential answers along with answers from the knowledge base to be ranked based at least in part on an outcome of comparing the feature vectors against the existing vectors in the knowledge base. In other words, the process of comparing the extracted feature vectors to the existing vectors allows for specific ones of the existing vectors in the knowledge base having question-answer pairs that are "sufficiently similar" to the received query to be identified. Moreover, by arranging each of the question-answer pairs identified from the knowledge base and/or the initial attempts at generating an answer to the received query, compute overhead may be focused on answers to questions that are at least somewhat similar to the present query. In preferred approaches, a degree of historical correction may be taken into consideration while ranking the various potential answers. In other words, at least some of the potential answers may be ranked by considering how closely they match historical question-answer pairs, while also considering how often the answers in the historical Q/A pairs have been corrected in the past.

With continued reference to FIG. 3, method 300 advances from operation 316 to operation 318. There, operation 318 includes causing a subset of the potential answers to be enriched (e.g., "decorated") with additional context and/or information that is relevant to the originally received query. Operation 318 thereby involves producing more detailed and contextually appropriate potential responses to the initial query. In some approaches, operation 318 involves sending one or more instructions to an answer enricher that is configured to enhance at least some of the ranked question-answer pairs with additional context or information. The answer enricher may have thereby been trained over time to add relevant details to selected answers, thereby improving the context and overall quality of the available answers (e.g., see answer enricher 274 of FIG. 2B).

From operation 318, method 300 advances to operation 320. There, operation 320 includes causing a final answer to be generated. The final answer is preferably generated based at least in part on the ranked and enriched (e.g., decorated) answers that are available to choose from. Accordingly, one or more instructions may be sent to a final answer generator that cause a final answer to be generated from the available answers. The process of generating the final answer to the received query preferably involves evaluating the correctness and context of the ranked answers and the enriched answers. In some approaches, the answers that are determined as being most correct and contextually relevant, in addition to being ranked desirably high (e.g., above a threshold, in a certain percentage, etc.) relative to the other potential answers, may be selected and/or combined to produce the final answer. Accordingly, the final answer is a linguistically nuanced response. In other words, a final answer is generated that is tailored for the user that submitted the initial query.

From operation 320, method 300 may perform optional operation 322. There, optional operation 322 includes translating the final response to a desired language before outputting the final answer. As noted above, while a received query may be expressed in a given language, the evaluation and response generation may be desirably performed in a different language. Thus, some of the final responses are generated in a different language than that which the initial query was expressed in. It follows that converting the final response back to the initial language improves the user experience and allows for a more comprehensive response. However, in some approaches the final answer generated in operation 320 may be output without performing any translation.

The operations in method 300 are desirably able to develop, manage, and leverage historical question-answer modeling as well as correlated vector embeddings to ensure accurate responses are generated by incorporating rich knowledge from past interactions. Moreover, using a multi-language translator and feature extraction enable seamless adaptation of the approaches herein to various languages, providing precise corrections for diverse user queries. The vector database combined with similarity scoring further streamlines the identification of relevant historical question-answer pairs, contributing to quick and accurate matching. Combining similarity scores and correction degrees also enables personalized answer ranking, prioritizing contextually relevant and historically accurate responses. Furthermore, continuous updates to the vector database and correction degree model create a dynamic system that refines its correction abilities over time, ensuring ongoing accuracy and relevance.

According to an in-use example which is in no way intended to be limiting, an incoming query states, "What are the environmental impacts of deforestation?" The vector representation of this query may be presented as $Q_{English}$. Moreover, a first potential answer may be generated in French, stating "La déforestation entraîne la perte d'habitats, affectant diverses espèces sauvages." A second potential answer may also be generated in Spanish, reading "La deforestación conduce a la pérdida de hábitat, afectando a diversas especies salvajes." Moreover, a third potential answer may be generated in German, stating "Entwaldung führt zu Lebensraumverlust und beeinflusst verschiedene wilde Arten." It follows that the potential answers may be expressed in different languages.

Each of these generated potential answers may thereby be ranked based on how similar each is to the initial English question. For instance, similarity scores may be calculated for each of the potential answers, e.g., as follows:

S1, FrenchS1, French=Cosine Similarity (QEnglish, A1, FrenchA1, French)

S2, SpanishS2, Spanish=Cosine Similarity (QEnglish, A2, SpanishS2, Spanish)

S3, GermanS3, German=Cosine Similarity (QEnglish, A3, GermanA3, German)

Moreover, the answers may be ranked based at least in part on their respective similarity scores. For instance, S1, French>S2, Spanish>S3, GermanS1, French>S2, Spanish>S3, German. As a result, the ranking suggests that Answer 1 in French is most similar to historical patterns in the vector database, followed by Answer 2 in Spanish, and then Answer 3 in German.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A method comprising:
causing a received query to be translated from a first language to a second language;
causing potential answers to be generated for the translated query;
causing features to be extracted from the translated query;
causing the extracted features to be converted into feature vectors;
causing the feature vectors to be compared against existing vectors in a knowledge base that correspond to past question-answer pairs;
causing the potential answers to be ranked based at least in part on an outcome of comparing the feature vectors against the existing vectors in the knowledge base;
causing a subset of the potential answers to be enriched with additional context and/or information;
causing a final answer to be generated based at least in part on the ranked potential answers and the enriched potential answers by:
combining at least one of the potential answers which addresses at least a portion of the received query and does not match the past question-answer pairs in the knowledge base, and two or more of the potential answers and/or the enriched potential answers which address portions of the received query and match respective entries in the knowledge base;
using an AI based model to apply weight values to feedback received from a user in response to the final answer being shown on a display screen; and
using the weighted feedback to re-train the AI based model.

2. The method of claim 1, wherein the causing the final answer to be generated includes:
evaluating correctness and context of the ranked potential answers and the enriched potential answers.

3. The method of claim 1, wherein causing a subset of the potential answers to be enriched with additional context and/or information includes:
incorporating how often the respective potential answers have been modified in response to being generated as previous final answers.

4. The method of claim 1, further comprising:
causing the final answer to be translated back to the first language; and
solving the received query by outputting the translated final answer,
wherein at least some of the past question-answer pairs in the knowledge base are expressed in languages that are different than the first and second languages.

5. The method of claim 1, wherein the knowledge base is formed by:
analyzing the past question-answer pairs;
extracting features from the past question-answer pairs; and
using the extracted features to build a historical question-answer model configured to capture characteristics of diverse language interactions.

6. The method of claim 5, further comprising:
converting the features extracted from the past question-answer pairs into the existing vectors; and
using the existing vectors to form a vector database in the knowledge base.

7. The method of claim 1, further comprising:
causing the final answer to be shown on the display screen.

8. A computer program product comprising:
one or more computer-readable storage media; and
program instructions stored on the one or more storage media to perform operations comprising:
causing a received query to be translated from a first language to a second language;
causing potential answers to be generated for the translated query;
causing features to be extracted from the translated query;
causing the extracted features to be converted into feature vectors;
causing the feature vectors to be compared against existing vectors in a knowledge base that correspond to past question-answer pairs;
causing the potential answers to be ranked based at least in part on an outcome of comparing the feature vectors against the existing vectors in the knowledge base;
causing a subset of the potential answers to be enriched with additional context and/or information by modifying the potential answers in the subset to incorporate how often the respective potential answers have been modified in response to being generated as previous final answers;
evaluating correctness and context of the ranked potential answers and the enriched potential answers;
causing a final answer to be generated based at least in part on the ranked potential answers and the enriched potential answers; and
using feedback that has been weighted to re-train an AI based model, wherein the unweighted feedback is received from a user in response to the final answer being shown on a display screen.

9. The computer program product of claim 8, wherein the causing the final answer to be generated based at least in part on the ranked potential answers and the enriched potential answers includes:
combining at least one of the potential answers which addresses at least a portion of the received query and does not match the past question-answer pairs in the knowledge base, and two or more of the potential answers and/or the enriched potential answers which address portions of the received query and match respective entries in the knowledge base.

10. The computer program product of claim 8, wherein at least some of the past question-answer pairs in the knowledge base are expressed in languages that are different than the first and second languages.

11. The computer program product of claim 8, wherein the operations further comprise:

causing the final answer to be translated back to the first language; and solving the received query by outputting the translated final answer.

12. The computer program product of claim 8, wherein the causing the potential answers to be ranked based at least in part on the outcome of comparing the feature vectors against the existing vectors in the knowledge base, includes:

using a similarity scoring mechanism to determine a cosine similarity between the received query and the question-answer pairs in the knowledge base.

13. The computer program product of claim 8, wherein the knowledge base is formed by:

analyzing the past question-answer pairs;

extracting features from the past question-answer pairs; and using the extracted features to build a historical question-answer model configured to capture characteristics of diverse language interactions.

14. The computer program product of claim 13, wherein the operations further comprise:

converting the features extracted from the past question-answer pairs into the existing vectors; and using the existing vectors to form a vector database in the knowledge base.

15. A computer system comprising:

a processor set;

one or more computer-readable storage media; and program instructions stored on the one or more storage media to cause the processor set to perform operations comprising:

causing a received query to be translated from a first language to a second language;

causing potential answers to be generated for the translated query;

causing features to be extracted from the translated query;

causing the extracted features to be converted into feature vectors;

causing the feature vectors to be compared against existing vectors in a knowledge base that correspond to past question-answer pairs;

causing the potential answers to be ranked based at least in part on an outcome of comparing the feature vectors against the existing vectors in the knowledge base;

causing a subset of the potential answers to be enriched by altering the potential answers in the subset based at least in part on how the respective potential answers have been modified in response to being generated as previous final answers;

evaluating correctness and context of the ranked potential answers and the enriched potential answers;

causing a final answer to be generated based at least in part on the ranked potential answers and the enriched potential answers; and using feedback that has been weighted to re-train an AI based model, wherein the unweighted feedback is received from a user in response to the final answer being shown on a display screen.

16. The computer system of claim 15, wherein the causing a final answer to be generated based at least in part on the ranked potential answers and the enriched potential answers includes:

combining at least one of the potential answers which addresses at least a portion of the received query and does not match the past question-answer pairs in the knowledge base, and two or more of the potential answers and/or the enriched potential answers which address portions of the received query and match respective entries in the knowledge base.

17. The computer system of claim 15, wherein at least some of the past question-answer pairs in the knowledge base are expressed in languages that are different than the first and second languages.

18. The computer system of claim 15, wherein the knowledge base is formed by:

analyzing the past question-answer pairs;

extracting features from the past question-answer pairs;

using the extracted features to build a historical question-answer model configured to capture characteristics of diverse language interactions;

converting the features extracted from the past question-answer pairs into the existing vectors; and using the existing vectors to form a vector database in the knowledge base.

* * * * *